United States Patent
Shiozaki

(10) Patent No.: US 10,484,595 B2
(45) Date of Patent: Nov. 19, 2019

(54) ELECTRONIC APPARATUS AND METHOD FOR CONTROLLING THE SAME

(71) Applicant: CANON KABUSHIKI KAISHA, Tokyo (JP)

(72) Inventor: Tomoyuki Shiozaki, Chatswood (AU)

(73) Assignee: CANON KABUSHIKI KAISHA, Tokyo (JP)

(*) Notice: Subject to any disclaimer, the term of this patent is extended or adjusted under 35 U.S.C. 154(b) by 28 days.

(21) Appl. No.: 15/393,063

(22) Filed: Dec. 28, 2016

(65) Prior Publication Data
US 2017/0195553 A1 Jul. 6, 2017

(30) Foreign Application Priority Data

Jan. 5, 2016 (JP) .................. 2016-000638

(51) Int. Cl.
| | | |
|---|---|---|
| H04N 5/232 | (2006.01) | |
| G06F 3/0488 | (2013.01) | |
| G03B 13/00 | (2006.01) | |
| G06F 3/0481 | (2013.01) | |
| G06F 3/0482 | (2013.01) | |
| H04N 5/235 | (2006.01) | |

(Continued)

(52) U.S. Cl.
CPC ....... *H04N 5/23216* (2013.01); *G06F 3/0488* (2013.01); *H04N 5/23245* (2013.01); *H04N 5/23293* (2013.01); *G03B 13/00* (2013.01); *G03B 2213/00* (2013.01); *G06F 3/0482* (2013.01); *G06F 3/04817* (2013.01); *H04N 5/238* (2013.01); *H04N 5/2353* (2013.01); *H04N 5/243* (2013.01)

(58) Field of Classification Search
None
See application file for complete search history.

(56) References Cited

U.S. PATENT DOCUMENTS

2006/0267966 A1 11/2006 Grossman
2009/0262211 A1* 10/2009 Mori ................. G06F 3/0412
348/222.1

(Continued)

FOREIGN PATENT DOCUMENTS

| JP | 2009-260681 A | 11/2009 |
|---|---|---|
| JP | 2010-134077 A | 6/2010 |

(Continued)

*Primary Examiner* — Sinh Tran
*Assistant Examiner* — Quan Pham
(74) *Attorney, Agent, or Firm* — Canon USA, Inc., IP Division

(57) ABSTRACT

An electronic apparatus determines that only a first touch operation moved by a predetermined movement amount in a predetermined time period is a valid operation, and determines that another touch operation is an invalid operation, when a user captures an image while looking into a finder. Then, even when a movement amount by which the touch determined to be the valid operation once is moved in the predetermined time period falls below the predetermined movement amount, the electronic apparatus continuously determines that this touch is the valid operation. Even when a Touch-Up is performed regarding the touch determined to be the valid operation, the electronic apparatus continuously determines that the touch determined to be the invalid operation is the invalid operation.

18 Claims, 5 Drawing Sheets

(51) Int. Cl.
    *H04N 5/238*     (2006.01)
    *H04N 5/243*     (2006.01)

(56) References Cited

U.S. PATENT DOCUMENTS

| | | |
|---|---|---|
| 2011/0249165 A1 | 10/2011 | Churei |
| 2012/0162105 A1* | 6/2012 | Sakurai .............. G06F 3/0488 345/173 |
| 2013/0201160 A1* | 8/2013 | Ito .................... G06F 3/0418 345/178 |
| 2014/0085525 A1* | 3/2014 | Ishihara .............. G03B 3/10 348/333.02 |
| 2014/0184867 A1* | 7/2014 | Sudo .................. G06F 3/0488 348/333.01 |
| 2014/0191983 A1 | 7/2014 | Choi |
| 2015/0002417 A1 | 1/2015 | Baek |
| 2018/0300015 A1* | 10/2018 | Heo .................. G06F 3/0412 |
| 2018/0324351 A1* | 11/2018 | Yoshimoto .......... G03B 17/00 |

FOREIGN PATENT DOCUMENTS

| | | |
|---|---|---|
| JP | 2013-161221 A | 8/2013 |
| JP | 2014-130450 A | 7/2014 |
| JP | 2014-149589 A | 8/2014 |
| WO | 2016/183866 A1 | 11/2016 |

\* cited by examiner

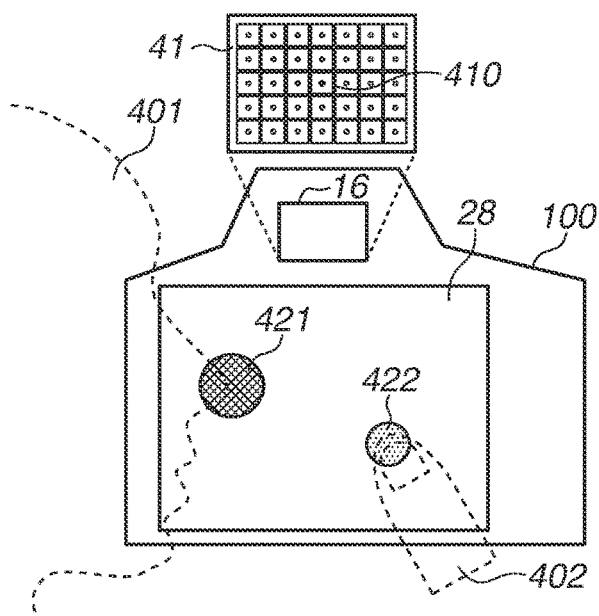
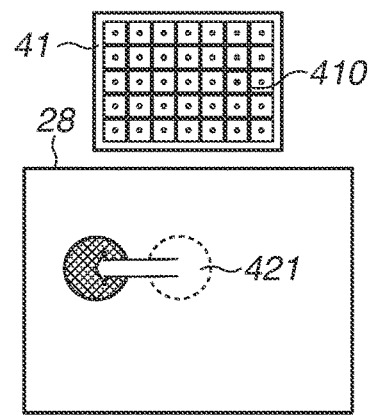
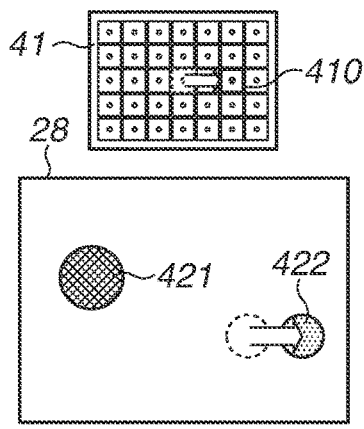
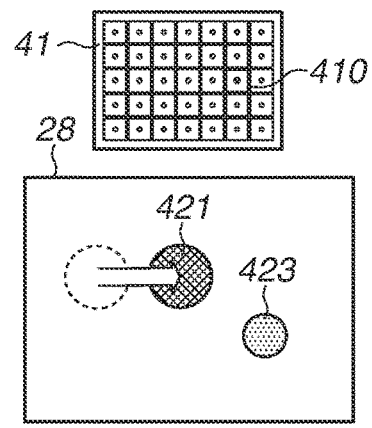
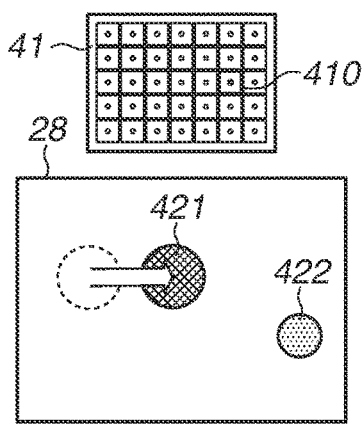
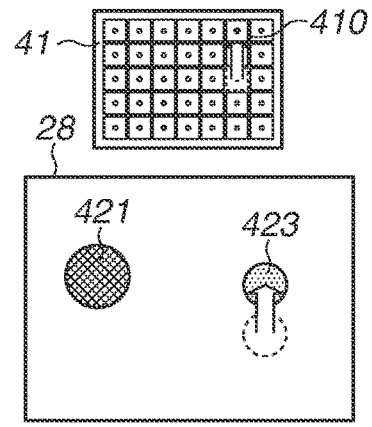

ELECTRONIC APPARATUS AND METHOD FOR CONTROLLING THE SAME

BACKGROUND OF THE INVENTION

Field of the Invention

The present invention relates to, in particular, an electronic apparatus, a method for controlling an electronic apparatus, and a storage medium effectively usable to prevent an operation caused by an unintended touch on a touch panel.

Description of the Related Art

In recent years, there has been known a touch panel as one of input apparatuses attracting attention. Several methods, such as the resistive film method, the capacitance method, and the optical method, are available as a detection method for the touch panel. Especially, for mobile devices, such as smart-phones, digital video cameras, and digital still cameras, models each equipped with the touch panel are in widespread use due to their convenience of being intuitively operable while displaying an operation screen and an imaging screen. Further, while screens of the mobile devices are enlarging more and more, the installation of the touch panel allows the mobile devices to cut down a space required for buttons, bringing about a huge merit.

On the other hand, some models among the digital cameras and the digital still cameras are configured in such a manner that a user captures an image while confirming a composition of the image by looking into an optical finder or an electronic viewfinder. However, in such a camera equipped with the finder, a part of user's face (a nose or the like) may touch a display surface of a rear display when the user captures the image while looking into the finder. If a part of the face touches the rear display where a touch panel operation is permitted over almost an entire surface, the camera may operate in response to an unintended operation.

With the aim of solving this problem, Japanese Patent Application Laid-Open No. 2009-260681 discusses a method in which the user preregisters information about an eye of the user who looks into the finder, and a region on the touch panel where an input is permitted is set according to this registered information. This method is assumed to allow the camera to prevent an unintended operation by invalidating a touch input onto a region outside the region where the input is permitted. However, the conventional technique discussed in Japanese Patent Application Laid-Open No. 2009-260681 leads to a limitation of the region on the touch panel where the input is permitted, thereby entailing a problem of reducing the usability.

SUMMARY OF THE INVENTION

An aspect of the present invention is directed to allowing an electronic apparatus to prevent the operation derived from the unintended touch without limiting the input range on the touch panel.

According to an aspect of the present invention, an electronic apparatus includes a detection unit configured to detect touch operations on a plurality of positions on a touch panel, a setting unit configured to set, as a valid operation, a touch operation in which a movement satisfying a predetermined condition has occurred among the plurality of touch operations detected by the detection unit, and set, as an invalid operation, another touch operation detected together with the touch operation set as the valid operation, and a control unit configured to perform processing according to the touch operation set as the valid operation by the setting unit without performing processing according to the touch operation set as the invalid operation by the setting unit.

According to another aspect of the present invention, an electronic apparatus includes a detection unit configured to detect touch operations on a plurality of positions on a touch panel, and a control unit configured to control the electronic apparatus to perform processing according to a first touch operation in which a movement satisfying a predetermined condition has occurred first, among the plurality of touch operations detected by the detection unit, and not to perform processing according to another touch operation detected together with the first touch operation.

According to yet another aspect of the present invention, an electronic apparatus includes a finder, an eye access detection unit configured to detect access of an eye to the finder, a detection unit configured to detect touch operations on a plurality of positions on a touch panel provided outside the finder, and a control unit configured to control the electronic apparatus to perform processing according to a first touch operation in which a movement satisfying a predetermined condition has occurred first among the plurality of touch operations detected by the detection unit, and not to perform processing according to another touch operation detected together with the first touch operation, while the access of the eye is detected by the eye access detection unit.

Further features of the present invention will become apparent from the following description of exemplary embodiments with reference to the attached drawings.

BRIEF DESCRIPTION OF THE DRAWINGS

FIGS. 4A to 4F illustrate a relationship between a touch and an operation of moving the AF frame.

DESCRIPTION OF THE EMBODIMENTS

An exemplary embodiment of the present invention will be described in detail below with reference to the accompanying drawings.

It is to be noted that the following exemplary embodiment is merely one example for implementing the present invention and can be appropriately modified or changed depending on individual constructions and various conditions of apparatuses to which the present invention is applied. Thus, the present invention is in no way limited to the following exemplary embodiment.

In the following description, the exemplary embodiment of the present invention will be described with reference to the drawings.

Figure 1A:
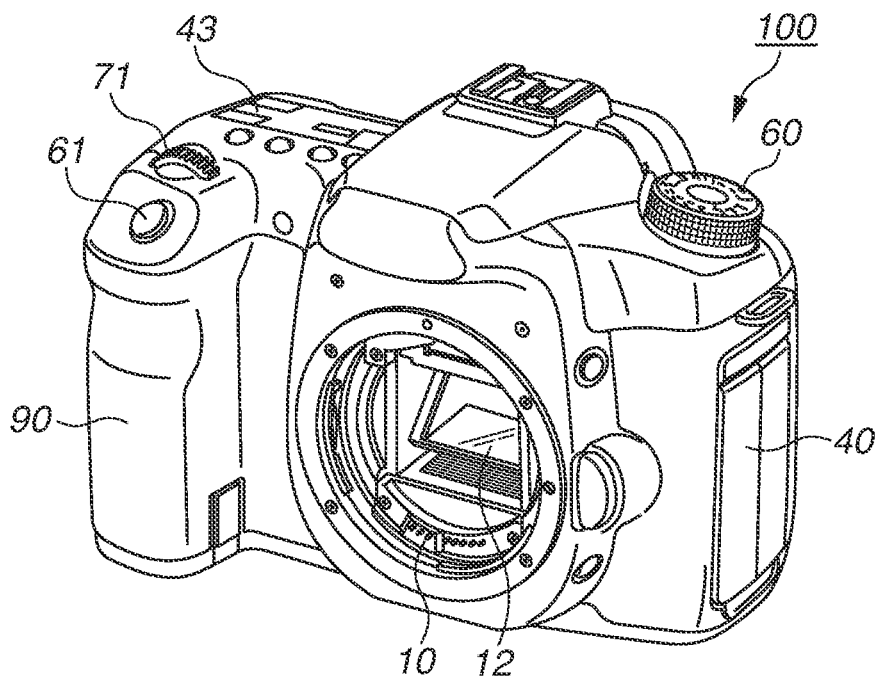
FIGS. 1A and 1B each illustrate an example of a configuration of an outer appearance of a digital camera according to an exemplary embodiment.
Figure 1B:
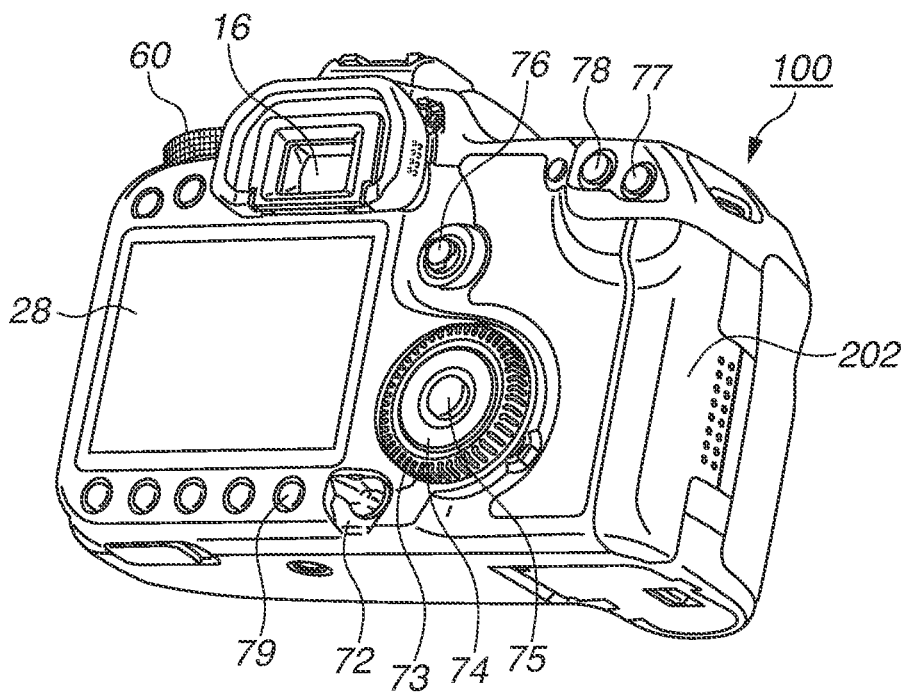

FIGS. 1A and 1B illustrate an example of a configuration of an outer appearance of a digital camera 100 according to the present exemplary embodiment. FIG. 1A is a perspective view of a front side of the digital camera 100, and FIG. 1B is a perspective view of a back side of the digital camera 100.

In FIGS. 1A and 1B, a display unit 28 provided on the back side of the digital camera 100 displays an image and various kinds of information. A finder external display unit 43 provided on a top surface of the digital camera 100 displays information indicating various setting values of the digital camera 100, such as a shutter speed and an aperture.

A shutter button 61 is an operation unit for issuing an instruction to capture an image. A mode selection switch 60 is an operation unit for switching various kinds of modes. A terminal cover 40 is a cover that protects a connector (not illustrated) for a connection cable or the like, which connects a connection cable leading to an external apparatus and the digital camera 100 to each other. A main electronic dial 71 is a rotational operation member, and a user can, for example, change the setting values, such as the shutter speed and the aperture, by rotating this main electronic dial 71.

A power switch 72 is an operation member for switching a power source of the digital camera 100 to ON or OFF. A sub electronic dial 73 is a rotational operation member, and an operation member for, for example, moving a selection frame and image advancing. A cross key 74 is a four-way key including an upper portion, a lower portion, a left portion, and a right portion that can be individually pressed, and allows the user to perform an operation according to the pressed portion of the cross key 74.

A SET button 75 is a pressing button, and is mainly used to, for example, determine a selected item. A live view (LV) button 76 is a button for switching a live view (hereinafter referred to as an LV) to ON or OFF in a menu button, and is used to instruct the digital camera 100 to start or stop capturing (recording) a moving image in a moving image capturing mode.

An enlargement button 77 is an operation button for switching an enlargement mode to ON or OFF in a live view display in an image capturing mode, and changing an enlargement ratio in the enlargement mode. The enlargement button 77 functions as an enlargement button for enlarging a playback image and increasing the enlargement ratio in a playback mode. A reduction button 78 is a button for reducing the enlargement ratio of the enlarged playback image to reduce the size of the displayed image. A playback button 79 is an operation button for switching the image capturing mode and the playback mode. Pressing the playback button 79 while the digital camera 100 is in the image capturing mode causes the digital camera 100 to shift to the playback mode, and allows the digital camera 100 to display an image regarding latest image data among pieces of image data recorded in a recording medium 200 on the display unit 28.

A quick-return mirror 12 is flipped up and down by a not-illustrated actuator according to an instruction from a system control unit 50. A communication terminal 10 is a communication terminal used for the digital camera 100 to communicate with a detachably attachable lens unit. A finder 16 is a finder configured to be looked into, which is usable to confirm a focus and a composition of an optical image of a subject that is acquired via the lens unit, which will be described below, by observing a focusing screen, which will be described below. An eye access detection unit (not illustrated), which will be described below, is built in the finder 16, and whether there is access of an eye can be detected. A cover 202 is a cover of a slot where the recording medium 200 is stored. A grip portion 90 is a holding portion shaped so as to allow the user to easily grip it with his/her right hand when holding the digital camera 100 with an attempt to capture the image.

Figure 2:
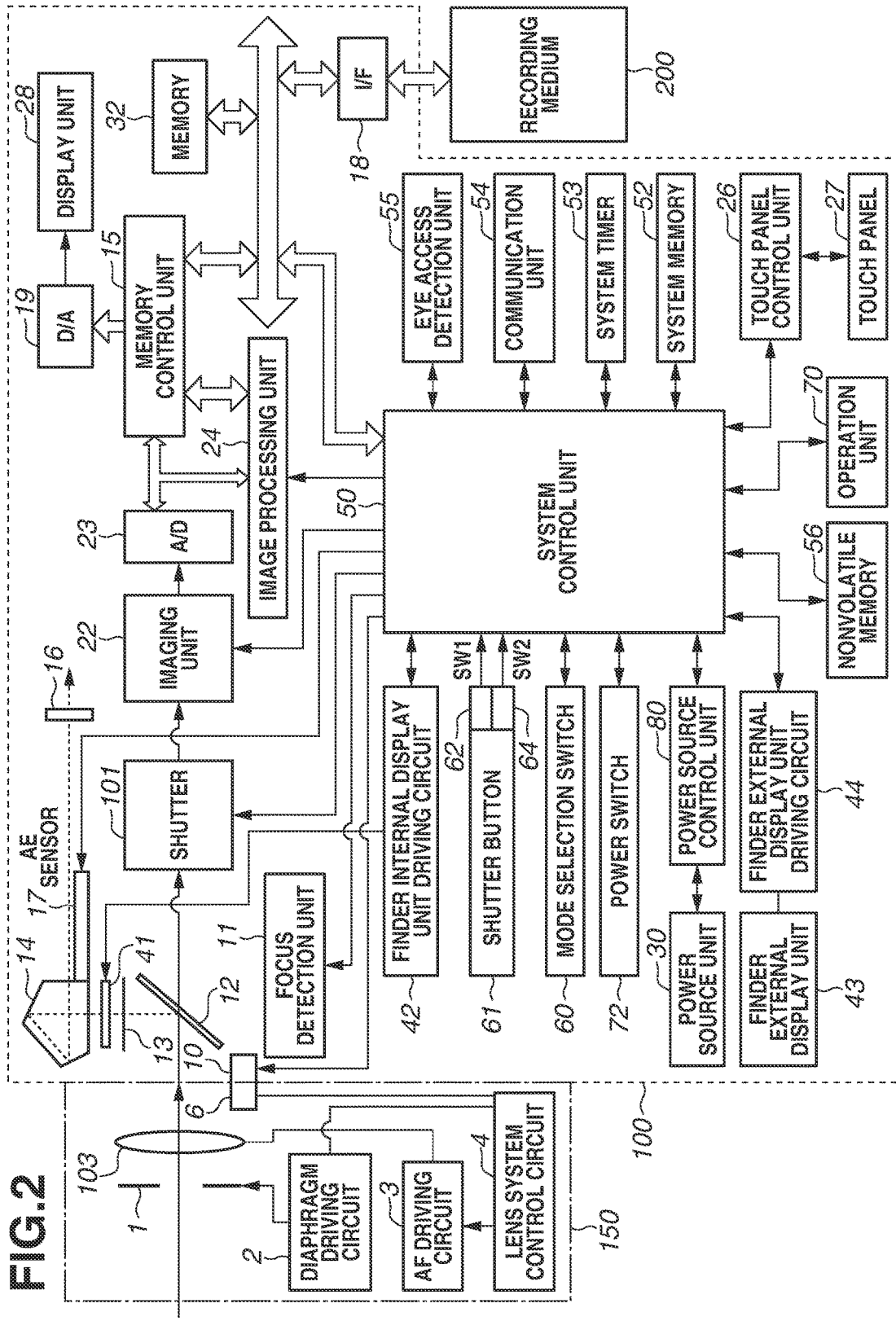
FIG. 2 is a block diagram illustrating an example of an internal configuration of the digital camera according to the exemplary embodiment.

FIG. 2 is a block diagram illustrating an example of an internal configuration of the digital camera 100 according to the present exemplary embodiment.

In FIG. 2, a lens unit 150 is a lens unit including a replaceable imaging lens.

A lens 103 is typically formed from a plurality of lenses, but is illustrated as being only one lens in FIG. 2 for the purpose of simplification. A communication terminal 6 is a communication terminal used for the lens unit 150 to communicate with the digital camera 100 side, and a communication terminal 10 is a communication terminal used for the digital camera 100 to communicate with the lens unit 150 side. The lens unit 150 causes the digital camera 100 to focus by communicating with the system control unit 50 via these communication terminals 6 and 10, controlling a diaphragm 1 via a diaphragm control circuit 2 by an internally provided lens system control circuit 4, and displacing a position of the lens 103 via an autofocus (AF) driving circuit 3.

An automatic exposure (AE) sensor 17 measures light to detect luminance of the subject that is acquired via the lens unit 150. A focus detection unit 11 outputs defocus amount information to the system control unit 50. The system control unit 50 controls the lens unit 150 based on the input defocus amount information to carry out phase difference AF.

The quick-return mirror 12 (hereinafter referred to as the mirror 12) is flipped up and down by the not-illustrated actuator according to the instruction from the system control unit 50 at the time of an exposure, capturing an image of the live view, and capturing a moving image. The mirror 12 is a mirror for switching a light flux incident from the lens 103 between a finder 16 side and an imaging unit 22 side. The mirror 12 is disposed so as to reflect the light flux to guide the light flux to the finder 16 at normal times. However, when the image is captured or the live view is displayed, the mirror 12 flips up so as to guide the light flux to the imaging unit 22, thereby being retracted from inside the light flux (mirror lock-up). Further, the mirror 12 is configured as a half mirror at a central portion thereof so as to permit the light to be partially transmitted therethrough, and allows the light flux to be partially transmitted therethrough so as to be incident on the focus detection unit 11 for detecting a focus.

The user capturing an image can confirm the focus and the composition of the optical image of the subject that is acquired via the lens unit 150 by observing a focusing screen 13 via a pentaprism 14 and the finder 16.

A shutter 101 is a focal plane shutter capable of freely controlling an exposure time period of the imaging unit 22 under control by the system control unit 50. The imaging unit 22 is an image sensor embodied by, for example, a charge coupled device (CCD) or complementary metal-oxide semiconductor (CMOS) element, which converts the optical image into an electric signal. An analog-to-digital (A/D) converter 23 converts an analog signal output from the imaging unit 22 into a digital signal.

An image processing unit 24 performs predetermined pixel interpolation, resizing processing such as a reduction, and color conversion processing on the data from the A/D converter 23 or data from a memory control unit 15. Further, the image processing unit 24 performs predetermined calculation processing with use of the image data acquired by capturing the image, and the system control unit 50 controls the exposure and distance measurement based on an acquired result of the calculation. Based on this control, the digital camera 100 performs AF processing, AE processing, and flash preliminary emission (herein below, referred to as electronic flash (EF)) processing of the Through-The-Lens (TTL) method. The image processing unit 24 further performs predetermined calculation processing with use of the image data acquired by capturing the image, and the digital camera 100 also performs automatic white balance (AWB) processing of the TTL method based on an acquired result of the calculation.

The output data from the A/D convertor 23 is written into a system memory 52 via the image processing unit 24 and the memory control unit 15, or is directly written into the system memory 52 via the memory control unit 15. The system memory 52 stores the image data acquired by the imaging unit 22 and converted into the digital data by the A/D converter 23, and image data to be displayed on the display unit 28. A memory 32 has a storage capacity sufficient to store a predetermined number of pieces of still image data, or moving image data and audio data lasting for a predetermined time period.

Further, the memory 32 also serves as a memory for the image display (a video memory). A digital-to-analog (D/A) converter 19 converts the data for the image display that has been stored in the memory 32 into an analog signal, and supplies the converted data to the display unit 28. In this manner, the image data for the display that is written in the memory 32 is displayed by the display unit 28 via the D/A converter 19. The display unit 28 presents a display according to the analog signal from the D/A converter 19 on a display device, such as a liquid crystal display (LCD). The digital camera 100 can provide a function as an electronic viewfinder and realize a through-the-lens image display (a live view display) by subjecting the digital signal first converted from the analog signal by the A/D converter 23 and then stored into the memory 23 to the conversion into the analog signal by the D/A converter 19, the sequential transfer to the display unit 28, and the presentation of the display.

A display item displayed on a finder internal display unit 41 can be visually confirmed together with the optical image of the subject via an eyepiece portion of the finder 16. A frame indicating a focusing point on which the autofocus is currently conducted (an AF frame), an icon indicating a setting state of the camera 100, and the like are displayed on the finder internal display unit 41 via a finder internal display unit driving circuit 42. The user can move a cursor position indicating the selected AF frame and change a point which the user wants to focus on while looking into the finder 16, by operating the operation unit 70. Further, the information indicating the various setting values of the digital camera 100, such as the shutter speed and the aperture, is displayed on the finder external display unit 43 via a finder external display unit driving circuit 44.

A nonvolatile memory 56 is an electrically erasable and recordable memory, and, for example, an electrically erasable programmable read only memory (EEPROM) is used as the nonvolatile memory 56. The nonvolatile memory 56 stores a constant, a program, and the like for an operation of the system control unit 50. The program described here refers to a program for performing various kinds of flowcharts that will be described below in the present exemplary embodiment.

The system control unit 50 controls the entire digital camera 100. The system control unit 50 realizes each processing procedure in the present exemplary embodiment that will be described below by executing the above-described program recorded in the nonvolatile memory 56. The system memory 52 is, for example, a random access memory (RAM), and the constant and a variable for the operation of the system control unit 50, the program read out from the nonvolatile memory 56, and the like are loaded into the system memory 52. Further, the system control unit 50 also performs display control by controlling the memory 32, the D/A converter 19, the display unit 28, and the like. A system timer 53 is a time measurement unit that measures a time period for use in various kinds of control, and a time of a built-in clock.

The mode selection switch 60, a first shutter button 62, a second shutter button 64, and the operation unit 70 are operation units for inputting various kinds of operation instructions to the system control unit 50.

The mode selection switch 60 is a switch for switching an operation mode of the system control unit 50 to any of a still image recording mode, the moving image capturing mode, the playback mode, and the like. Modes included in the still image recording mode include an automatic image capturing mode, an automatic scene determination mode, a manual mode, an aperture priority mode (an aperture value (Av) mode), and a shutter speed priority mode (a time value (Tv) mode). Further, the modes included in the still image recording mode include various kinds of scene modes, each of which corresponds to an imaging setting prepared for each imaging scene, a program AE mode, a custom mode, and the like. The user can directly switch the operation mode to any of these modes included in the menu button with use of the mode selection switch 60. Alternatively, the user may first switch the digital camera 100 to the menu button with use of the mode selection switch 60, and then switch the operation mode to any of these modes included in the menu button with use of another operation member after that. Similarly, the moving image capturing mode may also include a plurality of modes.

The first shutter switch 62 is switched on halfway through an operation of the shutter button 61 provided on the digital camera 100, i.e., upon a half-press of the shutter button 61 (an instruction to prepare to capture the image), and generates a first shutter switch signal SW1. In response to the first shutter switch signal SW1, the system control unit 50 starts an operation such as the AF processing, the AE processing, the AWB processing, and the EF (flash preliminary emission) processing.

The second shutter switch 64 is switched on upon completion of the operation of the shutter button 61, i.e., upon a full-press of the shutter button 61 (an instruction to capture the image), and generates a second shutter switch signal SW2. In response to the second shutter switch signal SW2, the system control unit 50 starts a series of imaging processing operations from reading out the signal from the imaging unit 22 to writing the image data into the recording medium 200.

The individual operation members of the operation unit 70 are appropriately assigned to functions for each scene and work as various kinds of functional buttons, by, for example, execution of an operation of selecting various functional icons displayed on the display unit 28. Examples of the functional buttons include an end button, a return button, an image jump button, a jump button, a depth-of-field preview button, and an attribute change button. For example, when the menu button is pressed, a menu screen, where various kinds of settings can be set, is displayed on the display unit 28. The user can intuitively make the various kinds of settings by using the menu screen displayed on the display unit 28, the up, down, left, and right cross key 74, and the SET button 75.

The operation unit 70 is various kinds of operation members as an input unit that receives an operation from the user. Further, the operation unit 70 includes at least the main electronic dial 71, the power switch 72, the sub electronic dial 73, the cross key 74, the SET button 75, the LV button 76, the enlargement button 77, the reduction button 78, and the playback button 79 illustrated in FIGS. 1A and 1B.

A touch panel 27, which can detect a touch onto the display unit 28, is configured integrally with the display unit 28, separately from the operation unit 70. For example, the touch panel 27 is configured in such a manner that a light transmittance thereof does not disturb the display on the display unit 28, and is mounted on an upper layer of a display surface of the display unit 28. Then, an input coordinate on the touch panel 27 and a display coordinate on the display unit 28 are associated with each other. This configuration can construct a graphical user interface (GUI) that appears as if the user can directly operate a screen displayed on the display unit 28.

The touch panel 27 notifies the system control unit 50 of coordinates of a position of the detected touch via a touch panel control unit 26. The system control unit 50 can detect the following touch operations onto the touch panel 27 or the following states of the touch panel 27 via the touch panel control unit 26.

A finger or the like that has not been in touch with the touch panel 27 newly touches the touch panel 27. In other words, the touch is started (hereinafter referred to as a Touch-Down).

The touch panel 27 is in a state touched by the finger or the like (hereinafter referred to as a Touch-On).

The finger or the like is being moved while being kept in touch with the touch panel 27 (hereinafter referred to as a Touch-Move).

The finger or the like that has been in touch with the touch panel 27 is separated from the touch panel 27. In other words, the touch is ended (hereinafter referred to as a Touch-Up).

The touch panel 27 is in a state touched by nothing (hereinafter referred to as a Touch-Off).

The touch panel 27 is in a state touched by the finger or the like as the Touch-On over a predetermined or larger area (hereinafter referred to as a Large-Object-Detect).

When the Touch-Down is detected, a start of the Touch-On is also detected at the same time. After the Touch-Down, the detection of the Touch-On normally continues as long as the Touch-Up is not detected. When the Touch-Move is detected, the touch panel 27 is also in the state that the Touch-On is detected. Even when the Touch-On is detected, the Touch-Move is not detected unless the position of the touch is being moved. After detection of the Touch-Up of all of the finger(s) or the like that has/have been in touch with the touch panel 27, the touch panel 27 transitions to the Touch-Off.

The touch panel control unit 26 can assign an identification number to each of a plurality of touches in which the Touch-Down is detected. For example, the touch panel control unit 26 chronologically assigns the number to the touch in which the Touch-Down is newly detected, starting from a lowest number among unassigned numbers. However, the order of the chronologically assigned numbers may be any of an ascending order and a descending order. The touch panel control unit 26 assigns the same identification number to touches while the Touch-On is maintained. Whether the detected touch is a touch while the Touch-On is maintained is determined based on whether coordinates of a position of a touch detected in a next frame are located within a predetermined range from coordinates of a position of a touch detected in a previous frame and having the identification number already assigned thereto. If the coordinates are located within the predetermined range, the touch is determined to be the touch corresponding to the same identification number. This identification number allows the Touch-Down, the Touch-On, the Touch-Move, the Touch-Up, and the Touch-Off to be determined. The control of assigning the identification number to each of the plurality of touches in which the Touch-Down is detected will be described assuming that the touch panel control unit 26 performs this control, but the digital camera 100 may be configured in such a manner that the system control unit 50 performs this control.

The system control unit 50 is notified of these operations and states, and the coordinates of the position of the touch via an internal bus after they are each associated with the identification number. The system control unit 50 determines a kind of operation performed on the touch panel 27 based on this information which the system control unit 50 is notified of. The system control unit 50 can also determine a movement amount, a movement speed, and a movement direction of the finger or the like moved on the touch panel 27 based on a change in the coordinates of the position. Further, the system control unit 50 can determine whether the Touch-Move is performed by a predetermined or larger movement amount or at a predetermined or higher movement speed. Further, it is defined that a stroke is drawn when the Touch-Up is performed after the Touch-Move is performed in a predetermined manner after the Touch-Down on the touch panel 27. An operation of quickly drawing the stroke is referred to as a flick. The flick is an operation of swiftly moving the finger only by a certain distance while keeping the finger in touch with the touch panel 27, and separating the finger from the touch panel 27 directly therefrom. In other words, the flick is an operation of speedily sliding the finger on the touch panel 27 as if flicking on the touch panel 27 with the finger. The flick can be determined to be performed when the Touch-Move performed by a predetermined or longer distance at a predetermined or higher speed is detected and the Touch-Up is detected directly therefrom.

Further, the touch panel control unit 26 can calculate an area of a touch input region where the Touch-Down is detected. More specifically, the touch panel control unit 26 can detect the touched area by calculating the number of sensors on the touch panel 27 that exceed a predetermined effective threshold value for detecting the touch. The system control unit 50 is notified of the detected touched area after the touched area is associated with the coordinates of the position and the identification number of the touch.

The touch panel 27 may be embodied by employing any type of touch panel among touch panels based on various methods, such as the resistive film method, the capacitance method, the surface acoustic wave method, the infrared method, the electromagnetic induction method, the image recognition method, and the optical sensor method. Depending on the method based on which the touch panel 27 is configured, how to detect the touch can be selected from a method detecting that the touch is input when the touch panel 27 is actually touched, and a method detecting that the touch is input when the finger or the like just approaches the touch panel 27, and the touch panel 27 may be embodied by employing any method of them.

A power source control unit 80 includes a battery detection circuit, a direct-current-to-direct-current (DC-DC) converter, a switch circuit that switches a block to which power is supplied, and the like. The power source control unit 80 detects whether a battery is mounted, a type of the battery, and a remaining battery level. Further, the power source control unit 80 controls the DC-DC converter based on a result of the detection and an instruction from the system control unit 50, and supplies a required voltage to each of the units including the recording medium 200 for a required time period.

A power source unit 30 includes a primary battery, such as an alkaline battery and a lithium (Li) battery, a secondary battery, such as a nickel-cadmium (NiCd) battery, a nickel metal hydride (NiMH) battery, and a Li battery, an alternating-current (AC) adapter, and the like. A recording medium interface (I/F) 18 is an interface with the recording medium 200, such as a memory card and a hard disk. The recording medium 200 is a recording medium for recording the captured image data, such as a memory card, and is formed of a semiconductor memory, a magnetic disk, or the like.

A communication unit 54 is connected wirelessly or via a cable for a wired connection, and transmits and receives a video signal and an audio signal. The communication unit 54 can also be connected to a wireless local area network (LAN) and the Internet. Further, the communication unit 54 can transmit the image data acquired from the imaging by the imaging unit 22 (including the through-the-lens image) and the image data recorded in the recording medium 200, and can receive image data and other various kinds of information from an external apparatus.

The eye access detection unit 55 includes an infrared emitter and a light reception circuit, and detects whether an object is located in proximity to a predetermined position by emitting infrared light at constant intervals and measuring a light amount reflected from the object. This detection allows the system control unit 50 to determine whether the user brings his/her eye closer to the finder 16.

Now, a method for controlling the digital camera 100 according to the present exemplary embodiment will be described with reference to FIGS. 3 and 4A to 4F. In the present exemplary embodiment, this control method will be described referring to a procedure in which the user moves the cursor position indicating the AF frame displayed on the finder internal display unit 41 via the touch panel 27 installed on the display unit 28 while looking into the finder 16 of the digital camera 100.

Figure 3:
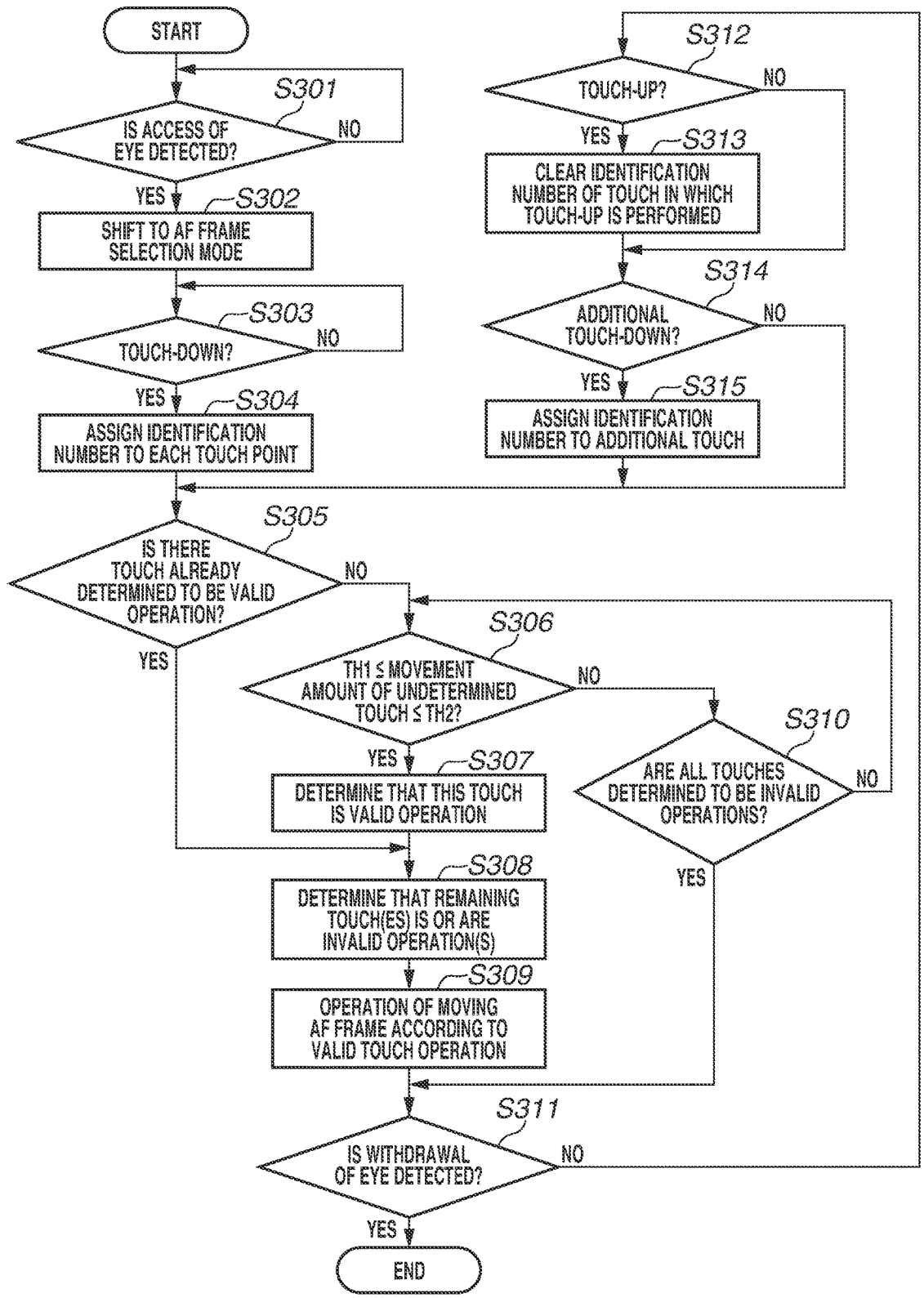
FIG. 3 is a flowchart illustrating one example of a processing procedure for moving an autofocus (AF) frame on the digital camera according to the exemplary embodiment.

FIG. 3 is a flowchart illustrating one example of a processing procedure for moving the AF frame on the digital camera 100 according to the present exemplary embodiment. The system control unit 50 develops the program stored in the nonvolatile memory 56 into the system memory 52 and executes the developed program, by which each process in the flowchart illustrated in FIG. 3 is realized.

First, in step S301, the eye access detection unit 55 detects whether the object is located in proximity to the predetermined position, and notifies the system control unit 50 of a result of the detection. The system control unit 50 receives this result of the detection, and determines whether the user brings his/her eye closer to the finder 16. If the user's eye is determined to be brought closer to the finder 16 (YES in step S301), the processing proceeds to step S302.

Next, in step S302, the system control unit 50 shifts the operation mode of the digital camera 100 to an AF frame selection mode. Then, the system control unit 50 drives the finder internal display unit driving circuit 42 to display the AF frame on the finder internal display unit 41. If a display is ongoing on the display unit 28 at the timing that the access of the eye is detected, the display on the display unit 28 may be turned off. Upon completion of the process in step S302, the processing proceeds to step S303.

Next, in step S303, the touch panel control unit 26 notifies the system control unit 50 of a result of detection of a Touch-Down. The system control unit 50 receives the detection notification, and determines whether a Touch-Down has been performed. If a Touch-Down is determined to have been performed (YES in step S303), the processing proceeds to step S304.

Next, in step S304, the touch panel control unit 26 assigns an identification number to a touch in which the Touch-Down is detected. The identification numbers are assigned, starting from the lowest number chronologically in the order that touches are detected. The touch panel control unit 26 notifies the system control unit 50 of coordinates of a position of the touch corresponding to the assigned identification number. Upon completion of the process in step S304, the processing proceeds to step S305.

Next, in step S305, the system control unit 50 determines whether there is a touch already determined to be a valid operation among touches in each of which a Touch-On is performed. If a result of this determination indicates that there is a touch already determined to be the valid operation (YES in step S305), the processing proceeds to step S308. If there is no touch already determined to be the valid operation (NO in step S305), the processing proceeds to step S306.

In step S306, the system control unit 50 determines whether a movement amount by which a touch not yet determined to be the valid operation or an invalid operation is moved in a predetermined time period is a first threshold value TH1 or larger and a second threshold value TH2 or smaller. If a result of this determination indicates that the movement amount is the first threshold value TH1 or larger and the second threshold value TH2 or smaller (YES in step S306), the processing proceeds to step S307. If the movement amount is smaller than the first threshold value TH1 or larger than the second threshold value TH2 (NO in step S306), the processing proceeds to step S310. Further, if there is no touch not yet determined to be the valid operation or the invalid operation, the processing also proceeds to step S310.

In step S307, the system control unit 50 determines that the touch, the movement amount of which has been determined to be true in step S306, is the valid operation. Further, the system control unit 50 associates a valid operation flag indicating the valid operation with the identification number, and stores that into the system memory 52. Upon completion of step S307, the processing proceeds to step S308.

Next, in step S308, the system control unit 50 determines that all of the remaining touch(es) in each of which the Touch-On is performed except for the touch determined to be the valid operation is or are the invalid operation(s). Further, the system control unit 50 associates an invalid operation flag indicating the invalid operation with the identification number, and stores that into the system memory 52.

Next, in step S309, the system control unit 50 performs processing for moving the cursor position indicating the selected AF frame displayed on the finder internal display unit 41 according to the Touch-Move of the touch determined to be the valid operation. At this time, processing according to the touch operation determined to be the invalid operation is not performed.

On the other hand, in step S310, the system control unit 50 determines whether the determination about whether the touch is the valid operation or the invalid operation is completed with respect to all of the touches in each of which the Touch-Down is detected. If the determination about whether the touch is the valid operation or the invalid operation is completed with respect to all of the touches (YES in step S310), the processing proceeds to step S311. On the other hand, if there is a touch with respect to which whether the touch is the valid operation or the invalid operation is not yet determined (NO in step S310), the processing returns to step S306, in which the system control unit 50 makes the determination with respect to the undetermined touch.

In step S311, the eye access detection unit 55 detects whether the object located at the predetermined position is separated therefrom, and notifies the system control unit 50 of a result of the detection. The system control unit 50 receives the result of the detection, and determines whether the user withdraws his/her eye from the finder 16. If a result of the determination indicates that the user withdraws his/her eye from the finder 16 (YES in step S311), the present processing flow is ended. On the other hand, if the user does not withdraw his/her eye from the finder 16 (NO in step S311), the processing proceeds to step S312.

In step S312, the touch panel control unit 26 notifies the system control unit 50 of a result of detection of a Touch-Up. Then, the system control unit 50 receives the notification from the touch panel control unit 26, and determines whether a Touch-Up is detected. If a result of the determination indicates that a Touch-Up is detected (YES in step S312), the processing proceeds to step S313. If no Touch-Up is detected (NO in step S312), the processing proceeds to step S314.

In step S313, the touch panel control unit 26 clears the identification number assigned to the touch in which the Touch-Up is detected, and notifies the system control unit 50 thereof. Then, the system control unit 50 clears the valid operation flag or the invalid operation flag stored in the system memory 52 in association with the identification number with respect to the touch in which the Touch-Up is detected. Upon completion of step S313, the processing proceeds to step S314.

Next, in step S314, the touch panel control unit 26 notifies the system control unit 50 of a result of detection of an additional Touch-Down. Then, the system control unit 50 receives the notification from the touch panel control unit 26, and determines whether an additional Touch-Down is detected. If a result of this determination indicates that an additional Touch-Down is detected (YES in step S314), the processing proceeds to step S315. If no additional Touch-Down is detected (NO in step S314), the processing proceeds to step S305.

In step S315, the touch panel control unit 26 assigns an identification number to a touch in which the Touch Down has been additionally detected in step S314. Then, the touch panel control unit 26 notifies the system control unit 50 of the assigned identification number and coordinates of a position of the touch. Upon completion of step S315, the processing proceeds to step S305.

Next, a relationship between the touch and the operation of moving the AF frame that is performed in the processing procedure illustrated in FIG. 3 will be described with reference to FIGS. 4A to 4F. FIG. 4A illustrates the relationship between the touch and the operation of moving the AF frame, and illustrates that the user's nose is in touch with the display unit 28. In the present exemplary embodiment, the touch panel 27 is disposed over the entire surface on the display unit 28. Further, in FIG. 4A, the finder internal display unit 41 in the finder 16 is illustrated above the digital camera 100 as an enlarged view.

In the example illustrated in FIG. 4A, thirty-five points of AF frames are displayed in the finder internal display unit 41, and the user can select an arbitrary point with the touch operation. In FIG. 4A, a cursor 410 indicating the selected AF frame is expressed by a bold line. In FIG. 4A, a touch 421 indicates a touched position where a touch of a part (the nose or the like) of a face 401 of the user onto the touch panel 27 is detected. On the other hand, a touch 422 indicates a touched position where a thumb 402 of a right hand of the user touches with the touch panel 27. For each of them, the touch panel control unit 26 notifies the system control unit 50 of barycentric coordinates of the touched position as the coordinates of the position of the touch.

If the access of the eye is detected in step S301 (YES in step S301), in step S302, the digital camera 100 shifts to the AF frame selection mode. In a case where the digital camera 100 first shifts to the AF frame selection mode after being started up, a central AF frame is set into a selected state as illustrated in FIG. 4A. If the touch panel control unit 26 detects a Touch-Down of each of the touches 421 and 422 in step S303 (YES in step S303), the system control unit 50 is notified of the result of the detection. In step S304, the touch panel control unit 26 assigns identification numbers 1 and 2 to the touches 421 and 422, respectively. The identification numbers are assigned sequentially, starting from the lowest number chronologically in the order that the Touch-Down is detected. In FIG. 4A, the touch panel 27 is in a state that no Touch-Move is detected regarding the touches 421 and 422 and there is no touch operation already determined to be the valid operation. Therefore, in step S305, the system control unit 50 determines that there is no valid touch (NO in step S305), so that the processing proceeds to step S306.

FIG. 4B illustrates that the user moves the thumb 402 of the right hand to the right on the touch panel 27 from the state illustrated in FIG. 4A, and a Touch-Move of the touch 422 is detected. For simplification of the illustration, the face 401 of the user, the thumb 402 of the right hand, the contour of the digital camera 100, and the finder 16 are omitted from the illustration of FIG. 4B. In step S306, the system control unit 50 detects that a movement amount by which the touch 422 is moved in the predetermined time period is the predetermined first threshold value TH1 or larger and the predetermined second threshold value TH2 or smaller (YES in step S306). Next, in step S307, the system control unit 50 determines that the touch 422 is the valid operation, associates the identification number 2 and the valid operation flag with each other, and stores that into the system memory 52. This storage causes the touch 422 to be continuously determined to be the valid operation while the Touch-On thereof is maintained. On the other hand, the present case leads to a repetition of the processes in steps S306 and S310 until the Touch-Move of the touch 422 is detected.

On the other hand, in step S308, the system control unit 50 determines that the touch 421 is the invalid operation, associates the identification number 1 and the invalid operation flag with each other, and stores that into the system memory 52. This storage causes the touch 421 to be continuously determined to be the invalid operation while the Touch-On thereof is maintained.

Further, in step S309, the system control unit 50 controls the display in such a manner that the cursor 410 indicating the selected AF frame displayed on the finder internal display unit 41 is moved according to the movement direction and the movement amount of the position of the touch 422. At this time, the movement direction of the cursor 410 indicating the selected AF frame and the movement direction of the position of the touch 422 determined to be the valid operation are the same as each other, and the movement amounts thereof are in a proportional relationship with each other.

Further, in the present exemplary embodiment, the coordinates of the position on the touch panel 27 where the touch 422 determined to be the valid operation is located, and the coordinates of the position on the finder internal liquid crystal display unit 41 where the cursor 410 is located are in a relative positional relationship with each other. In other words, the position of the cursor 410 does not change according to the position of the Touch-Down of the touch 422, but the movement direction and the movement amount of the cursor 410 from the current position are determined according to the movement direction and the movement amount of the touch 422 that are defined based on the position of the Touch-Down.

FIG. 4C illustrates that the user moves the face 401 to the right on the touch panel 27 from the state illustrated in FIG. 4B, and a Touch-Move of the touch 421 is detected. Further, no Touch-Move of the touch 422 is detected. At this time, since the touch 421 has been determined to be the invalid operation in step S308, the cursor 410 indicating the selected AF frame is not moved. On the other hand, since the touch 422 has been determined to be the valid operation in step S307, the touch 422 is continuously determined to be the valid operation while the Touch-On thereof is maintained even if there is a state in which the Touch-Move is stopped as illustrated in FIG. 4C.

FIG. 4D illustrates that the user separates the thumb 402 of the right hand from the touch panel 27 from the state illustrated in FIG. 4C, and a Touch-Up of the touch 422 is detected. At this time, the touch panel 27 is in a state that the Touch-Move of the touch 421 is ongoing. In step S312, the touch panel control unit 26 notifies the system control unit 50 of a result of the detection of the Touch-Up of the touch 422 (YES in step S312). Then, in step S313, the touch panel control unit 26 clears the identification number 2 assigned to the touch 422. At this time, the identification number of the touch 421 remains unchanged from the identification number 1. Further, the system control unit 50 determines that the Touch-Up is detected, and clears the valid operation flag stored in the system memory 52 in association with the identification number 2. On the other hand, since the invalid operation flag stored in association with the identification number 1 is not cleared, the system control unit 50 determines that the Touch-Move of the touch 421 is the invalid operation, and does not move the cursor 410 indicating the selected AF frame.

Further, in step S305, there is no longer a touch already determined to be the valid operation (NO in step S305), so that the processing proceeds to step S306. Then, in step S306, there is no touch not yet determined to be the valid operation or the invalid operation (NO in step S306), so that this case leads to a repetition of the processing with the processing proceeding to step S311 via step S310 (YES in step S310).

FIG. 4E illustrates a state in which the user touches the touch panel 27 with the thumb 402 of the right hand again from the state illustrated in FIG. 4D. At this time, the touch panel 27 is in the state that the Touch-Move of the touch 421 is detected. The touch with the thumb 402 of the right hand illustrated in FIG. 4E is referred to as a touch 423 to make this touch distinguishable from the touch 422 illustrated in FIGS. 4A to 4C. At this time, in step S314, the touch panel 27 detects an additional Touch-Down, and notifies the system control unit 50 thereof (YES in step S314). Next, in step S315, the touch panel control unit 26 assigns an identification number to the detected touch 423. In this case, the identification number 2 is assigned to the touch 423 because the identification number 2, which is the lowest number, is available now. The touch panel control unit 26 notifies the system control unit 50 of the assigned identification number and coordinates of a position of the touch 423. Then, the processing proceeds to step S305.

In step S305, there is no touch already determined to be the valid operation (NO in step S305), so that the processing proceeds to step S306. In step S306, the system control unit 50 determines whether the movement amount by which the touch is moved in the predetermined time period is the first threshold value TH1 or larger and the second threshold value TH2 or smaller only with respect to the touch 423, which is not yet determined to be the valid operation or the invalid operation. The touch 421 is already determined to be the invalid operation, so that the movement amount thereof is not subjected to the determination. Therefore, in the state illustrated in FIG. 4E, the system control unit 50 determines that the Touch-Move of the touch 421 is the invalid operation, and does not move the cursor 410 indicating the selected AF frame. Further, in the state illustrated in FIG. 4E, no Touch-Move of the touch 423 is detected (NO in step S306), so that the processing proceeds from step S306 to step S310. Then, the present case leads to a repetition of the processes in steps S306 and S310 (NO in step S310) until a Touch-Move of the touch 423 is detected.

FIG. 4F illustrates that the user moves up the thumb 402 of the right hand on the touch panel 27 from the state illustrated in FIG. 4E, and a Touch-Move of the touch 423 is detected. In step S306, the system control unit 50 detects that a movement amount by which the touch 423 is moved in the predetermined time period is the first threshold value TH1 or larger and the second threshold value TH2 or smaller (YES in step S306). Next, in step S307, the system control unit 50 determines that the touch 423 is the valid operation, associates the identification number 2 and the valid operation flag with each other, and stores that into the system memory 52. On the other hand, the touch 421 is already determined to be the invalid operation. In step S309, the system control unit 50 controls the display in such a manner that the cursor 410 indicating the selected AF frame displayed on the finder internal display unit 41 is moved according to the movement direction and the movement amount of the position of the touch 423.

In this manner, according to the present exemplary embodiment, the digital camera 100 can prevent an operation error derived from a touch resulted from an accidental touch of a part of the user's face (the nose or the like) onto the display surface of the display unit 28 when the user captures the image while looking into the finder 16. For example, the position of the cursor 410 indicating the AF frame is moved according to the movement amount of the position of the touch determined to be the valid operation. Therefore, the movement of the cursor 410 is not triggered only by the detection of the Touch-Down. This mechanism can prevent an operation error derived from an unexpected and unintended Touch-Down.

Further, in the present exemplary embodiment, only the first touch operation moved by the predetermined movement amount in the predetermined time period is determined to be the valid operation, and another touch operation other than that is determined to be the invalid operation. This mechanism can prevent an operation error derived from an unintended touch occurred while an intended Touch-Move operation is ongoing. In addition, in the present exemplary embodiment, the touch panel control unit 26 assigns the identification number to each touch in which the Touch-Down is detected, which can facilitate management of the valid operation and the invalid operation. The identification number and the result of the determination about whether the touch is the valid operation or the invalid operation are managed in the system memory 52 in association with each other, which allows the determination to be maintained as long as the detection of the Touch-On continues.

Even when the movement amount by which the touch determined to be the valid operation once is moved in the predetermined time period falls below the predetermined movement amount, for example, as illustrated in FIG. 4C, the establishment of the valid operation flag is maintained, so that this touch can be continuously determined to be the valid operation. Further, even when the Touch-Up is performed regarding the touch determined to be the valid operation, for example, as illustrated in FIG. 4D, the establishment of the invalid operation flag is maintained for the touch determined to be the invalid operation, so that this touch can be continuously determined to be the invalid operation. Therefore, the operation derived from the unintended touch can be continuously prevented. Further, the present exemplary embodiment is efficient in terms of the fact that, even when the additional Touch-Down occurs, whether the touch is the valid operation or the invalid operation only has to be determined with respect to the additionally detected touch, without this determination made with respect to the touch to which the identification number is assigned. While the operation derived from the unintended touch can be prevented in this manner, the touch moved by the movement amount that allows this touch to be determined to be the user's intended operation can be appropriately detected. Further, the touch operation can be received over the entire surface of the touch panel 27 without narrowing the region where the touch is detectable, which allows the user to enjoy a comfortable operation. Further, the present exemplary embodiment is characterized by its high usability, because the detection of the access of the eye is used as the condition for shifting to the AF frame selection mode, and this allows the mode to be changed without shifting via another operation unit.

Regarding the control by the system control unit 50, a single hardware device may perform it, or a plurality of hardware devices may realize the control of the entire apparatus by dividing the processing among them. Further, in the present exemplary embodiment, the condition for determining the valid operation has been described as being such a condition that the touch is determined to be the valid operation when the touch is moved by the predetermined movement amount in the predetermined time period, but the movement speed of the position of the touch may be used as the determination condition. By setting the condition for determining the valid operation in such a manner that the touch is determined to be the valid operation when the movement speed thereof exceeds a predetermined movement speed, a touch operation moved by only a small movement amount, like the flick operation, can be determined to be the valid operation.

Further, the area touched by the finger or the like performing the Touch-On may be added to the condition for determining the valid operation. As illustrated in FIGS. 4A to 4F, the touched area detected from the touch of a part of the face or the like is larger than the touched area from the touch of the finger. In this case, the digital camera 100 is configured in such a manner that the system control unit 50 is notified of a result of calculation of the touched area by the touch panel control unit 26, and the system control unit 50 determines whether the touched area is a predetermined value or smaller. In other words, the condition for determining the valid operation is set in such a manner that a touch moved by a movement amount or at a movement speed satisfying the predetermined condition and also applied over a touched area of the predetermined value or smaller is determined to be the valid operation. Setting the condition in this manner can further effectively prevent false detection due to the touch of the face or the like onto the touch panel 27.

Further, in the present exemplary embodiment, the processing performed according to the touch operation has been described as the operation of selecting the AF frame, but the present invention is not limited to such an exemplary embodiment, and can be applied to every kind of operation. For example, the present invention may be applied to an operation of changing a setting of another imaging condition of the digital camera 100.

FIGS. 5A to 5F illustrate examples of setting screens displayed on the finder internal display unit 41. The examples illustrated in FIGS. 5A to 5F will be described assuming that the digital camera 100 is configured to be able to present various graphic displays while superimposing them on the optical image on the transparent finder internal display unit 41, by way of example.

Figure 5A:
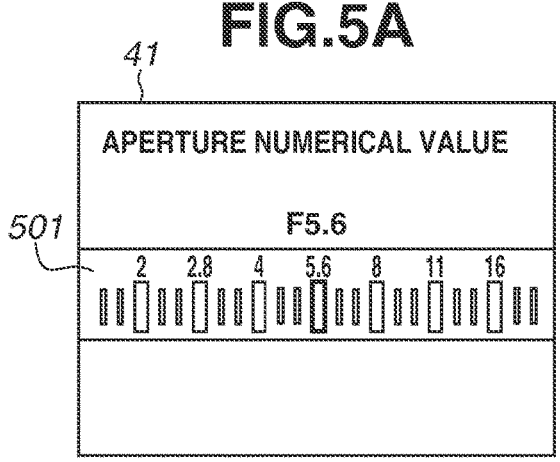
FIGS. 5A to 5F illustrate examples of setting screens displayed on a finder internal display unit.

FIG. 5A illustrates an example of a screen where the aperture setting value displayed on the finder internal display unit 41 is changed by an operation onto the touch panel 27. Upon detecting the Touch-Down after detecting the access of the eye, the digital camera 100 shifts to a mode of changing the aperture setting value, and a band-like scale indicating aperture setting values is displayed while being superimposed on the optical image. Scale marks are labeled corresponding aperture setting values, and an entire display of a band-like portion 501 can be scrolled to the left and the right according to the movement amount of the position of the touch determined to be the valid operation. Further, the currently set aperture value is indicated by a scale mark surrounded by a bold frame at a center of the band-like portion 501, and the currently set aperture value is displayed above the band-like portion 501 as a numerical value. In this case, an unintended operation can be prevented by similar processing to that illustrated in FIG. 3, by setting a movement amount within a predetermined range spanning in the leftward and rightward directions as the condition for determining the valid operation.

Figure 5D:
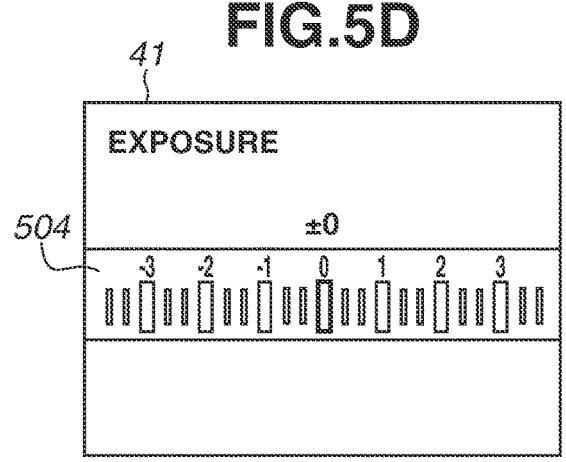
Figure 5B:
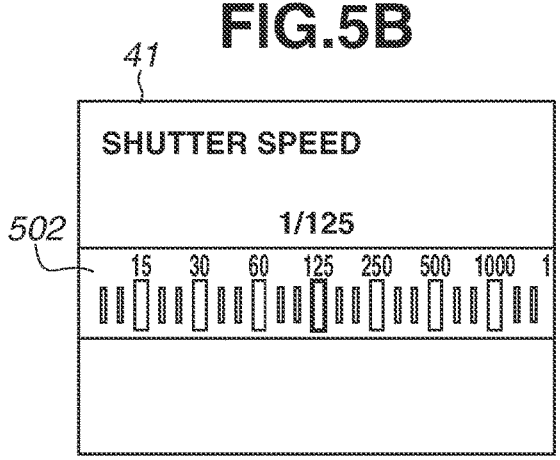
Figure 5E:
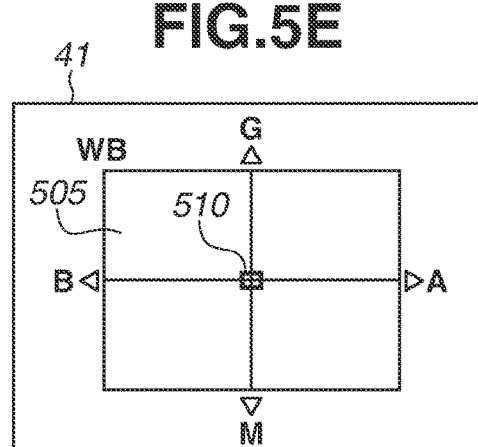
Figure 5C:
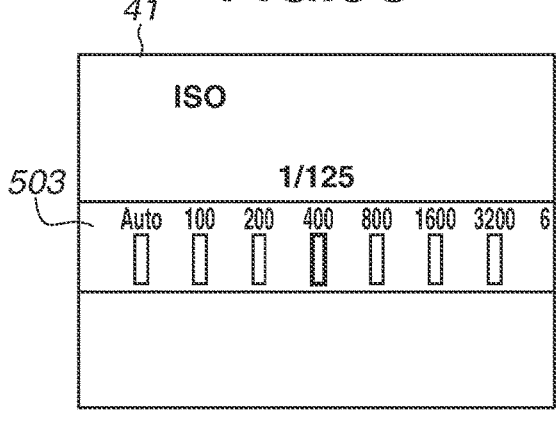

Similarly, FIGS. 5B to 5D illustrate display examples of screens where the shutter speed, a setting value of International Standards Organization (ISO) sensitivity, and an exposure setting value are set, respectively. Similarly to the example illustrated in FIG. 5A, the setting values can be changed by scrolling scales displayed on band-like portions 502 to 504, respectively, to the left and the right according to the movement amount of the position of the touch determined to be the valid operation. Further, similarly to the example illustrated in FIG. 5A, an unintended operation can be prevented by similar processing to FIG. 3, by setting a movement amount within a predetermined range spanning in the leftward and rightward directions as the condition for determining the valid operation.

Further, FIG. 5E illustrates an example of a screen where a WB setting value displayed on the finder internal display unit 41 is changed with an operation onto the touch panel 27.

In FIG. 5E, B, A, G, and M represent Blue, Amber, Green, and Magenta colors, respectively. A cursor 510 indicated by a bold frame at a center in a frame 505 can be moved according to the movement amount of the position of the touch determined to be the valid operation. At this time, the WB setting value can be changed in the respective directions of the colors, by moving the cursor 510 in the respective directions of B, A, G, and M axes.

Figure 5F:
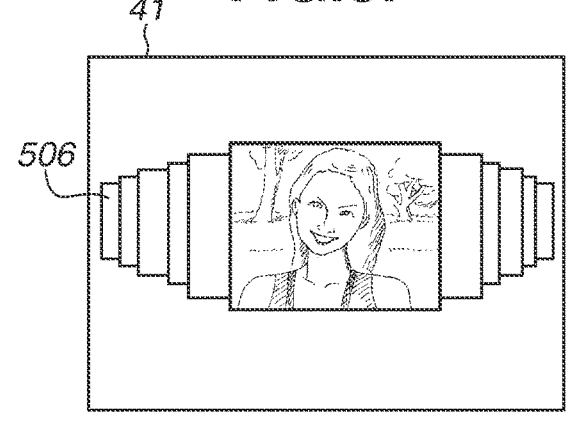

Further, FIG. 5F illustrates an example of a screen where the image displayed on the finder internal display unit 41 is changed with an operation onto the touch panel 27. A portion indicated as an image group 506 expresses a graphic display where thumbnail images are lined up one after another while overlapping each other, and an image displayed at a center can be played back. The display image can be selected by scrolling the images according to the movement amount of the position of the touch determined to be the valid operation. The present exemplary embodiment is effective in allowing the user to comfortably change the imaging setting by preventing an operation derived from a touch error that the user may make by performing the touch operation while looking into the finder 16 in this manner.

While the examples in which the imaging setting and the playback image are changed have been described above, the present exemplary embodiment can be applied to changing other various settings. In the present exemplary embodiment, the finder 16 is assumed to be configured as an optical finder (an optical viewfinder (OVF)), but may be configured as a liquid crystal or organic electro luminescence (EL) electronic viewfinder (EVF). In this case, the present exemplary embodiment can bring about a merit of allowing the user to confirm the captured image to which the imaging setting is applied as the through-the-lens image (the live view image) in the finder 16, in addition to being capable of presenting a high-definition graphic display.

Further, the present invention has been described in detail based on the digital camera 100 as an exemplary embodiment thereof, but the present invention is not limited to such a specific exemplary embodiment and also includes various embodiments within the range that does not depart from the scope and spirit of the present invention. The present invention can be applied to every type of electronic apparatus as long as the electronic apparatus includes a touch detection unit capable of detecting touch operations at a plurality of portions on the touch panel. For example, the present invention may be applied to a display apparatus such as an image viewer. In this case, a display color on a display screen can be adjusted with an operation onto the screen illustrated in FIG. 5E, and a display image can be changed with an operation onto the screen illustrated in FIG. 5F. For example, the present invention may be applied to an audio apparatus such as a music player. In this case, the audio apparatus can be configured to change a playback audio volume according to the movement amount of the touch determined to be the valid operation. Further, the present invention can be applied to a personal computer, a personal digital assistant (PDA), a mobile phone terminal, a printer apparatus equipped with a display, a digital photo frame, a game machine, an electronic book reader, and the like. In any of the embodiments, the present invention can achieve the effect of preventing an unintended operation derived from a touch of a part of a hand, a body, or the like onto the touch detection unit, allowing the user to enjoy a comfortable touch operation.

According to the present invention, the operation derived from the unintended touch can be prevented without limiting the input range on the touch panel.

Embodiment(s) of the present invention can also be realized by a computer of a system or apparatus that reads out and executes computer executable instructions (e.g., one or more programs) recorded on a storage medium (which may also be referred to more fully as a 'nontransitory computer-readable storage medium') to perform the functions of one or more of the above-described embodiment(s) and/or that includes one or more circuits (e.g., application specific integrated circuit (ASIC)) for performing the functions of one or more of the abovedescribed embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-000638, filed Jan. 5, 2016, which is hereby incorporated by reference herein in its entirety.

What is claimed is:

1. An electronic apparatus comprising:
   one or more processors which, when executing instructions, causes the electronic apparatus to function as:
   a first detection unit configured to detect touch operations at a plurality of positions on a touch panel;
   a second detection unit configured to detect a proximity of an object to a predetermined position;
   a setting unit configured to, regarding each of the plurality of touch operations detected by the first detection unit, set a touch operation whose movement amount satisfies a predetermined condition as a valid operation and set a touch operation whose movement amount does not satisfy the predetermined condition as an invalid operation, when the proximity of the object is detected by the second detection unit; and
   a control unit configured to perform processing according to the touch operation set as the valid operation by the setting unit, and configured not to perform processing according to the touch operation set as the invalid operation by the setting unit,
   wherein, in a case where the setting unit determines that one of the plurality of touch operations has been set as the valid operation, the setting unit sets each of the touch operations except for the one set as the valid operation as the invalid operation, regardless of whether the predetermined condition is satisfied or not, when the proximity of the object is detected by the second detection unit.

2. The electronic apparatus according to claim 1, wherein the setting unit is configured to maintain the set valid operation as the valid operation until the set valid operation is no longer detected by the first detection unit.

3. The electronic apparatus according to claim 2, wherein the setting unit is configured to maintain the set invalid operation as the invalid operation even after the set valid operation is no longer detected by the first detection unit.

4. The electronic apparatus according to claim 3, wherein the setting unit is configured to maintain the set invalid operation as the invalid operation regardless of duration of a touch by the set the invalid operation.

5. The electronic apparatus according to claim 4, wherein, if a touch operation is newly detected by the first detection unit after the valid operation is no longer detected by the first detection unit, the setting unit sets the newly detected touch operation as either of the valid operation or the invalid operation.

6. The electronic apparatus according to claim 1, wherein the setting unit is configured to set, as the valid operation, a predetermined number of the touch operation or touch operations in which the movement amount satisfies the predetermined condition.

7. The electronic apparatus according to claim 6, wherein the predetermined number is one.

8. The electronic apparatus according to claim 1, wherein the predetermined condition is that a movement amount or a movement speed of the touch operation on the touch panel falls within a predetermined range.

9. The electronic apparatus according to claim 1, wherein the first detection unit is further configured to detect an area touched on the touch panel together with the touch operation from among the plurality of touch operations, and
wherein the setting unit is further configured to set the touch operation as the valid operation if the movement amount satisfies the predetermined condition and the touched area regarding the touch operation in which the movement has occurred is a predetermined value or smaller.

10. The electronic apparatus according to claim 1, wherein the one or more processors, when executing the instructions, further causes the electronic apparatus to function as an assignment unit configured to assign an identification number to each of the plurality of touch operations detected by the first detection unit,
wherein the setting unit is configured to set the valid operation or the invalid operation based on the identification number assigned by the assignment unit.

11. The electronic apparatus according to claim 10, wherein the electronic apparatus is an imaging apparatus including a viewfinder and the touch panel outside the viewfinder, and
wherein the control unit sets an imaging condition as the processing according to the touch operation set as the valid operation.

12. The electronic apparatus according to claim 11, wherein the control unit is configured to set a position on which focus detection is carried out as the processing according to the touch operation set as the valid operation.

13. The electronic apparatus according to claim 11, wherein the control unit is configured to set at least one of an aperture value, a shutter speed, International Standards Organization (ISO) sensitivity, an exposure correction value, and white balance as the processing according to the touch operation set as the valid operation.

14. The electronic apparatus according to claim 1, wherein the control unit is configured to change at least one of a display image, a display color, and an audio volume as the processing according to the touch operation set as the valid operation.

15. The electronic apparatus according to claim 1, wherein the one or more processors, when executing the instructions, further causes the electronic apparatus to function as a display control unit configured to display a setting screen for performing the processing according to the touch operation set as the valid operation on a display unit,
wherein the display control unit is configured to move a position of a cursor displayed on the setting screen according to the movement of the touch operation set as the valid operation.

16. The electronic apparatus according to claim 1, wherein the one or more processors, when executing the instructions, further causes the electronic apparatus to function as a display control unit configured to display a setting screen for performing the processing according to the touch operation set as the valid operation on a display unit,
wherein the display control unit is configured to scroll the setting screen.

17. A method for controlling an electronic apparatus, the method comprising:
detecting touch operations at a plurality of positions on a touch panel;
detecting a proximity of an object to a predetermined position;
regarding each of the detected plurality of touch operations, setting a touch operation whose movement amount satisfies a predetermined condition as a valid operation and set a touch operation whose movement amount does not satisfy the predetermined condition as an invalid operation, when the proximity of the object is detected;
performing processing according to the touch operation set as the valid operation by the setting, and not performing processing according to the touch operation set as the invalid operation by the setting,
wherein, in a case where the setting determines that one of the plurality of touch operations has been set as the valid operation, the setting sets each of the touch operations except for the one set as the valid operation as the invalid operation, regardless of whether the predetermined condition is satisfied or not, when the proximity of the object is detected.

18. A computer-readable non-transitory storage medium storing a program for causing a computer to execute a method comprising:
detecting touch operations at a plurality of positions on a touch panel;
detecting a proximity of an object to a predetermined position;
regarding each of the detected plurality of touch operations, setting a touch operation whose movement amount satisfies a predetermined condition as a valid operation and set a touch operation whose movement amount does not satisfy the predetermined condition as an invalid operation, when the proximity of the object is detected; and
performing processing according to the touch operation set as the valid operation by the setting, and not performing processing according to the touch operation set as the invalid operation by the setting,
wherein, in a case where the setting determines that one of the plurality of touch operations has been set as the valid operation, the setting sets each of the touch operations except for the one set as the valid operation as the invalid operation, regardless of whether the predetermined condition is satisfied or not, when the proximity of the object is detected.

* * * * *